United States Patent
Sato

(10) Patent No.: US 8,582,023 B2
(45) Date of Patent: Nov. 12, 2013

(54) ELECTRONIC DEVICE WITH A STORAGE CASE AND LID WHICH IS OPENABLE/CLOSABLE AND LOCKABLE WITH STORAGE CASE

(75) Inventor: Jiro Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 260 days.

(21) Appl. No.: 12/908,320

(22) Filed: Oct. 20, 2010

(65) Prior Publication Data

US 2011/0149144 A1 Jun. 23, 2011

(30) Foreign Application Priority Data

Dec. 22, 2009 (JP) .................................. 2009-290971

(51) Int. Cl.
*H04N 5/225* (2006.01)
*G03B 17/02* (2006.01)

(52) U.S. Cl.
USPC .......................................... 348/373; 396/539

(58) Field of Classification Search
USPC .......... 348/372, 373, 374, 375, 376; 396/277, 396/535, 536, 539; D16/200, 219
See application file for complete search history.

(56) References Cited

U.S. PATENT DOCUMENTS

| | | | | |
|---|---|---|---|---|
| 6,929,878 B2 * | 8/2005 | Chen et al. | ..................... | 429/100 |
| 7,058,295 B2 * | 6/2006 | Nishiwaki | ..................... | 396/539 |
| 7,465,516 B2 * | 12/2008 | Nagura | ............................. | 429/99 |
| 7,617,944 B2 * | 11/2009 | Noguchi | ..................... | 220/254.6 |
| 7,936,278 B2 * | 5/2011 | Ahn et al. | ..................... | 340/693.5 |
| 8,081,488 B2 * | 12/2011 | Kondo et al. | .................. | 361/801 |
| 8,244,122 B2 * | 8/2012 | Itoda et al. | ..................... | 396/539 |
| 8,395,060 B2 * | 3/2013 | Kajiyama et al. | ............. | 396/536 |
| 2006/0014437 A1 * | 1/2006 | Yin | .............................. | 439/630 |
| 2006/0208077 A1 * | 9/2006 | Hirata | ............................ | 235/441 |
| 2007/0205208 A1 * | 9/2007 | Ueda | ............................. | 220/813 |
| 2010/0062324 A1 * | 3/2010 | Ooyama | .......................... | 429/97 |
| 2010/0242367 A1 * | 9/2010 | Kawai et al. | ..................... | 49/348 |
| 2010/0265388 A1 * | 10/2010 | Soumi | ........................... | 348/374 |

FOREIGN PATENT DOCUMENTS

| | | | |
|---|---|---|---|
| CN | 101847699 A | | 9/2010 |
| JP | 2001084975 A | * | 3/2001 |
| JP | 2004055282 A | * | 2/2004 |
| JP | 2006208748 A | * | 8/2006 |

(Continued)

OTHER PUBLICATIONS

Translation of JP 2001-084975 A; Mar. 30, 2001.*

(Continued)

*Primary Examiner* — John Villecco
(74) *Attorney, Agent, or Firm* — Cowan, Liebowitz & Latman, P.C.

(57) ABSTRACT

An electronic device capable of generating a click force when a lid member is operated to be opened or closed, without increasing the number of parts. The electronic device includes a storage case formed with a first shaft hole in which a pivot shaft of a battery lid is positioned when the battery lid is locked with the storage case and a second shaft hole in which the pivot shaft is positioned when the battery lid is released from locking with the storage case. A hook portion of the storage case is disposed to face a space extending between the first and second shaft holes, and pivoted in a direction to expand the space when the pivot shaft is moved between the first and second shaft holes than when the pivot shaft is positioned in the first or second shaft hole.

12 Claims, 6 Drawing Sheets

(56) References Cited

FOREIGN PATENT DOCUMENTS

| | | | | |
|---|---|---|---|---|
| JP | 2007116475 | A | * | 5/2007 |
| JP | 2008-027637 | | | 2/2008 |
| JP | 2009070608 | A | * | 4/2009 |
| JP | 2009110903 | A | * | 5/2009 |
| JP | 2009165020 | A | * | 7/2009 |

OTHER PUBLICATIONS

The above reference was cited in a Feb. 1, 2013 Chinese Office Action, which is enclosed with English Translation, that issued in Chinese Patent Application No. 201010589810.7.

* cited by examiner

ELECTRONIC DEVICE WITH A STORAGE CASE AND LID WHICH IS OPENABLE/CLOSABLE AND LOCKABLE WITH STORAGE CASE

BACKGROUND OF THE INVENTION

1. Field of the Invention

The present invention relates to an electronic device having a storage unit that has an openable/closable lid member.

2. Description of the Related Art

An image pickup apparatus (e.g., a digital camera) has a lid open/close mechanism for opening/closing a battery lid of a battery storage case. Some lid open/close mechanism has a shaft hole that slidably holds a support shaft of the battery lid and a click spring that generates a click force when the battery lid is slid.

In recent years, with the increasing demand for low-priced digital cameras, it has been demanded to reduce the number of parts for cost reduction. To this end, the click spring is sometimes formed integrally with the battery storage case by using a resin material. In that case, however, the battery lid is often restricted in shape due to a die structure, posing a problem of impairing a high-quality feeling by allowing the interior of the camera to be visible through a gap appearing around the click spring when the battery lid is slid.

Japanese Laid-open Patent Publication No. 2008-27637 discloses an image pickup apparatus having a battery lid open/close mechanism that includes a click spring, fabricated separately from a battery storage case, for rotatably holding a battery lid support shaft and for generating a click force when a battery lid is slid to be opened or closed.

However, the proposed battery lid open/close mechanism requires the click spring other than the battery lid and the battery storage case, resulting in a problem of increasing the number of parts and the cost.

SUMMARY OF THE INVENTION

The present invention provides an electronic device capable of generating a click force when a lid member is operated to be opened or closed, without increasing the number of parts.

According to the present invention, there is provided an electronic device comprising a storage case and a lid member having a pivot shaft and being openable and closable relative to the storage case and lockable with the storage case, wherein the storage case is formed with a first shaft hole in which the pivot shaft is positioned when the lid member is locked with the storage case and a second shaft hole in which the pivot shaft is positioned when the lid member is released from locking with the storage case, the first and second shaft holes being formed in communication with each other, and a hook is disposed between the first and second shaft holes to be pivotable by being in contact with the pivot shaft moved between the first and second shaft holes while being in contact with the hook.

According to the present invention, the hook is pivotably disposed to face between the first and second shaft holes. When the lid member is operated to be opened or closed, the pivot shaft of the lid member is brought in contact with the hook and pivots the hook to thereby generate a click force. It is therefore possible to obtain a click force when the lid member is operated to be opened or closed, without increasing the number of parts.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
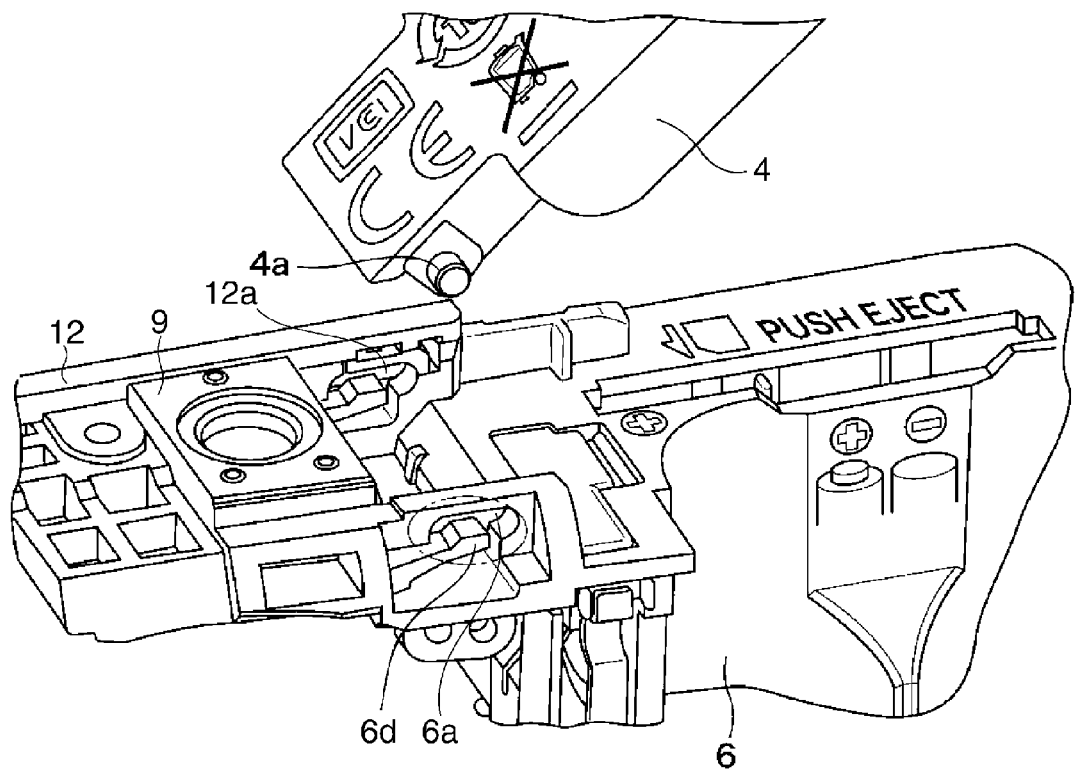
FIG. 1 is a fragmentary perspective view showing a part of a battery storage case of an image pickup apparatus as an electronic device according to one embodiment of this invention in a state where a battery lid is detached from the battery storage case.
Figure 2A:
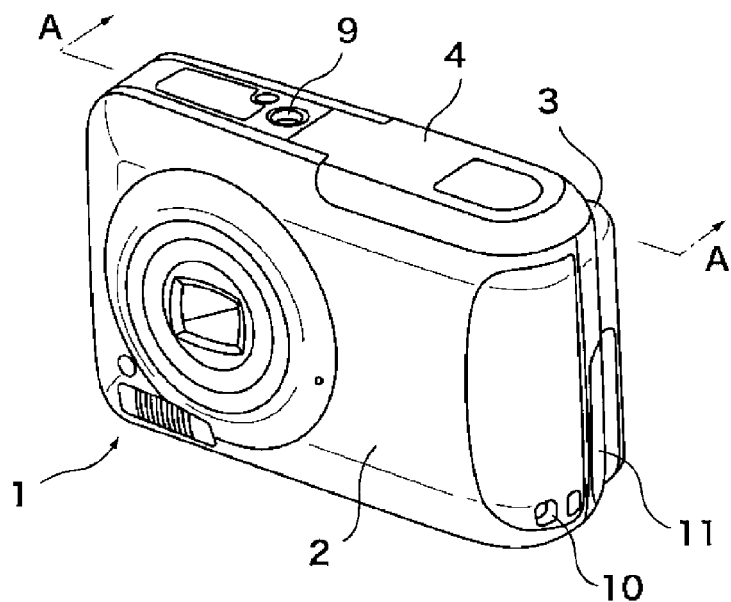
FIG. 2A is a perspective view showing an outer appearance of the image pickup apparatus in a state where the battery lid is fully closed.
Figure 2B:
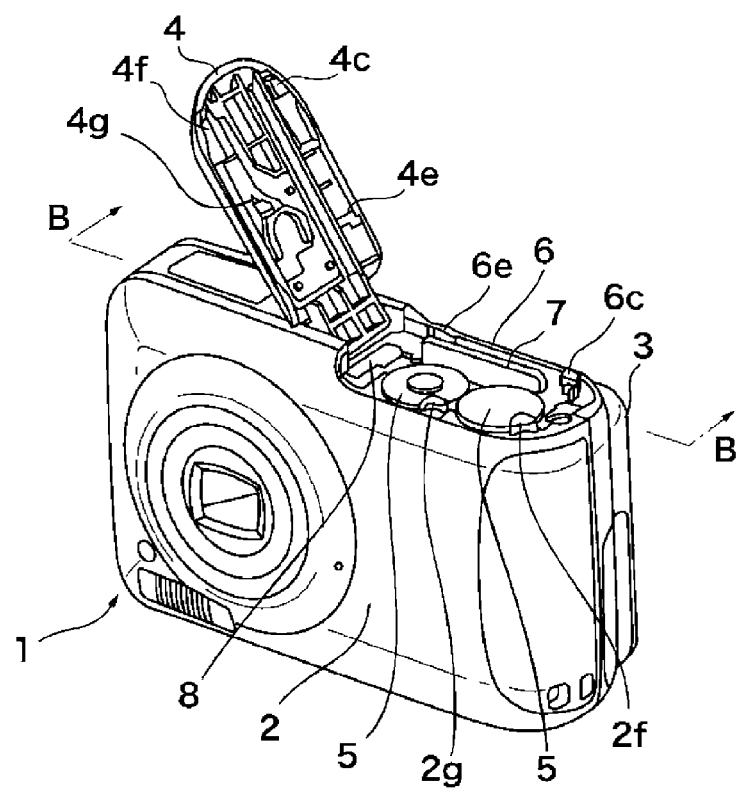
FIG. 2B is a perspective view showing an outer appearance of the battery storage case in a state where the battery lid is fully opened.
Figure 3:
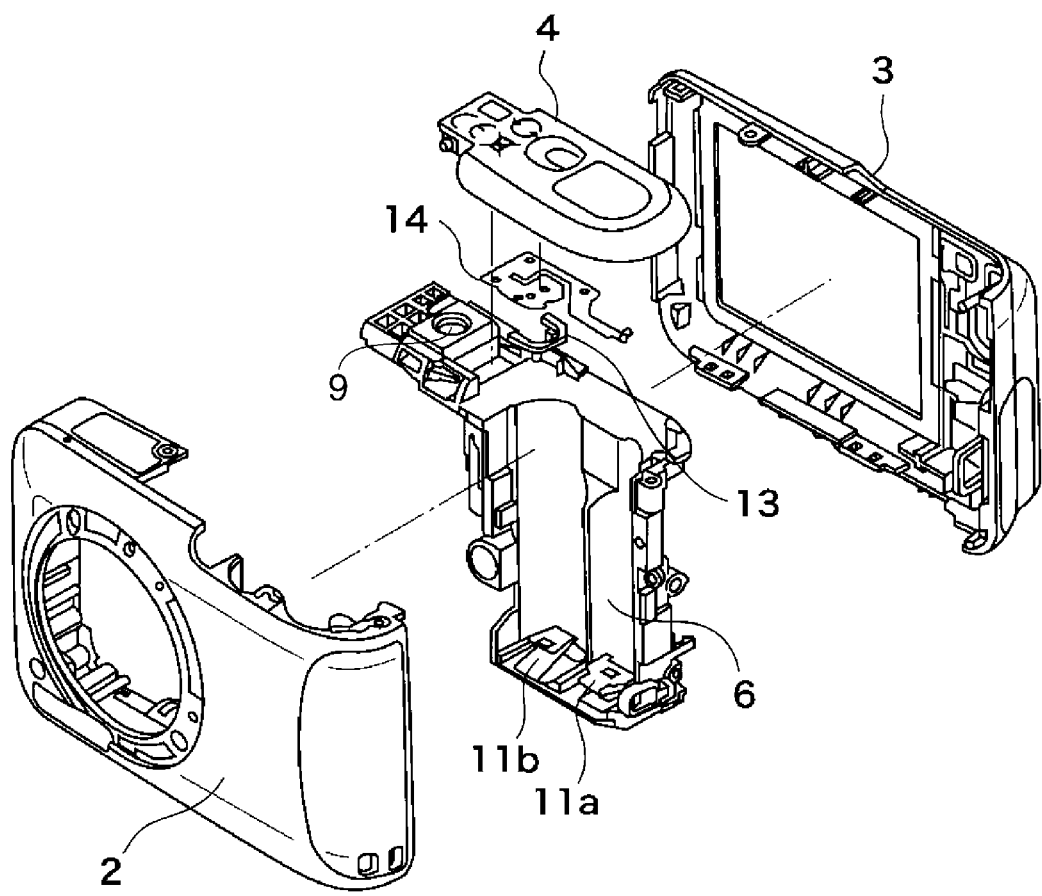
FIG. 3 is an exploded perspective view showing the construction of the battery lid, front cover, and rear cover of the image pickup apparatus.

FIG. 1 shows in perspective view a battery storage case of an image pickup apparatus as an electronic device according to one embodiment of this invention in a state where a battery lid is detached from the battery storage case. FIGS. 2A and 2B show in perspective view an outer appearance of the image pickup apparatus in respective states where the battery lid is fully closed and where the lid is fully opened. FIG. 3 shows the construction of the battery lid, front cover, and rear cover of the image pickup apparatus in exploded perspective view.

As shown in FIGS. 2A and 2B, the image pickup apparatus 1 is configured as a digital camera that includes front and rear covers 2, 3 covering mechanisms disposed inside the apparatus, a battery lid 4 (more generally, a lid member), and a battery storage case 6 (more generally, a storage case). The front and rear covers 2, 3 constitute a part of a housing of the image pickup apparatus 1 (hereinafter, referred to as the housing). The battery lid 4 is openably/closably attached to a bottom surface of the housing. The battery storage case 6 disposed inside the housing has an opening that is opened/closed by the battery lid 4, so that batteries 5 can be inserted into and extracted from the battery storage case 6 through the opening. The battery storage case 6 accommodates a memory card 7 for storing photographed image data, and is provided with a coin battery holder 8 for accommodating a coin battery that supplies backup power to save various settings of the image pickup apparatus 1.

On a side surface of the housing, there are provided a hole 10 for fixing a strap belt and a jack cover 11 for protecting an external interface connector (not shown) disposed inside the image pickup apparatus. Although not shown, a power button, operation buttons, a zoom lever are provided on an upper surface of the housing, and a liquid crystal display for displaying photographed images is provided on a rear surface of the housing.

As shown in FIG. 1, a tripod base 9 for being fixed with a tripod is disposed on the side of the bottom surface of the housing and formed integrally with the battery storage case 6. A pivot shaft 4a is formed integrally with the battery lid 4 at one end of the lid 4. The battery lid 4 is configured to be openable and closable relative to the opening of the battery storage case 6. To attach the battery lid 4 to the battery storage case 6, the pivot shaft 4a is inserted into an elongated battery lid-mounting hole 6a formed in the battery storage case 6, whereby the battery lid 4 is slidably and rotatably fixed to the storage case 6.

Referring to FIG. 3, a battery reverse-connection prevention guard 13 that prevents the batteries from being inserted with reverse polarity into the battery storage case 6 is fixed by, e.g., thermal fusion to a lid-side battery contact piece 14. The battery contact piece 14 to which the reverse-connection prevention guard 13 has been fixed is fixed by, e.g., thermal fusion to a rear surface of the battery lid 4 for contact with battery lid-side terminals of the batteries 5 (FIG. 2B) inserted into the storage case 6. Plus and minus battery contacts 11a, 11b are provided on a lower side (as viewed in FIG. 3) of the battery storage case 6 for contact with respective ones of minus and plus terminals the batteries 5 inserted into the storage case 6.

Next, with reference to FIGS. 2 to 6, an open/close mechanism of the battery lid 4 will be described.

Figure 4A:
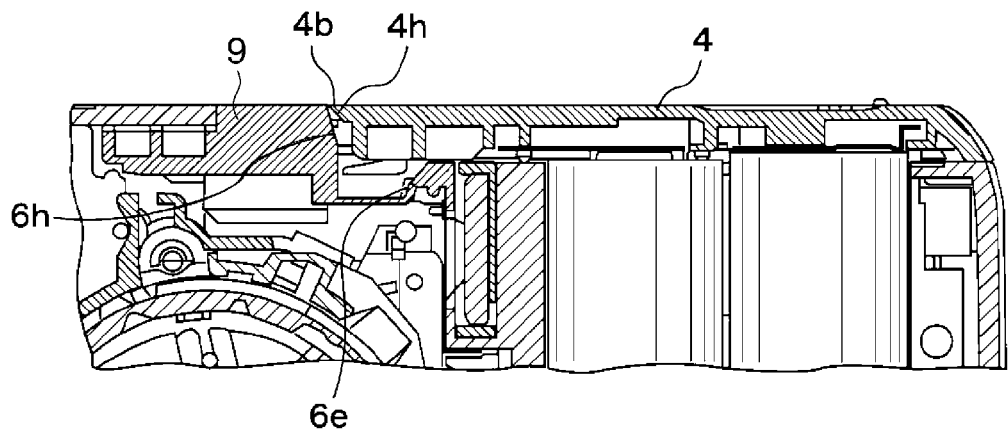
FIG. 4A is a fragmentary section view taken along line A-A shown in FIG. 2A, showing the construction of the battery lid and the battery storage case.
Figure 4B:
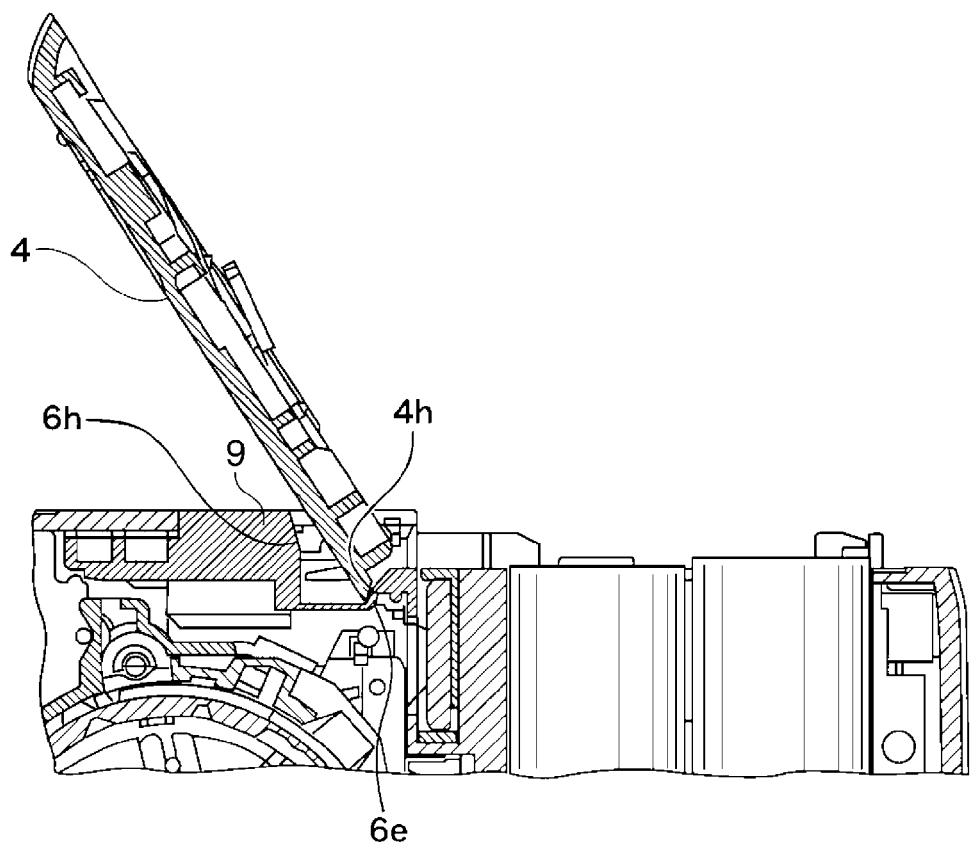
FIG. 4B is a fragmentary section view taken along line B-B shown in FIG. 2B, showing the construction of the battery lid and the battery storage case.
Figure 5A:
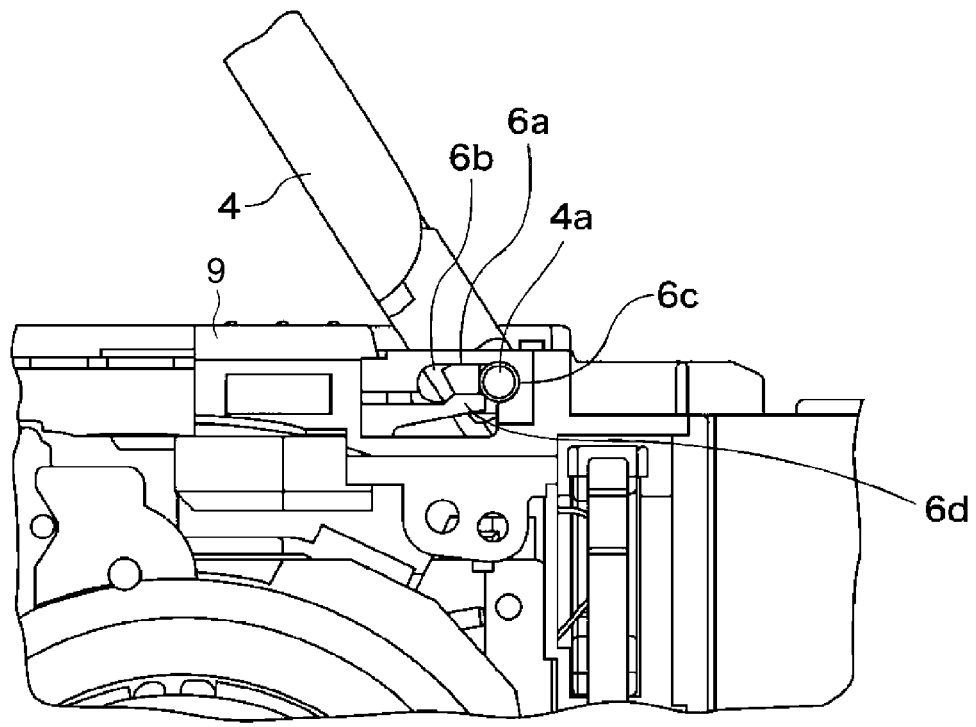
FIG. 5A is a fragmentary enlarged view showing a positional relation between a pivot shaft of the battery lid and a battery lid-mounting hole of the battery storage case in a state where the battery lid is fully opened.
Figure 5B:
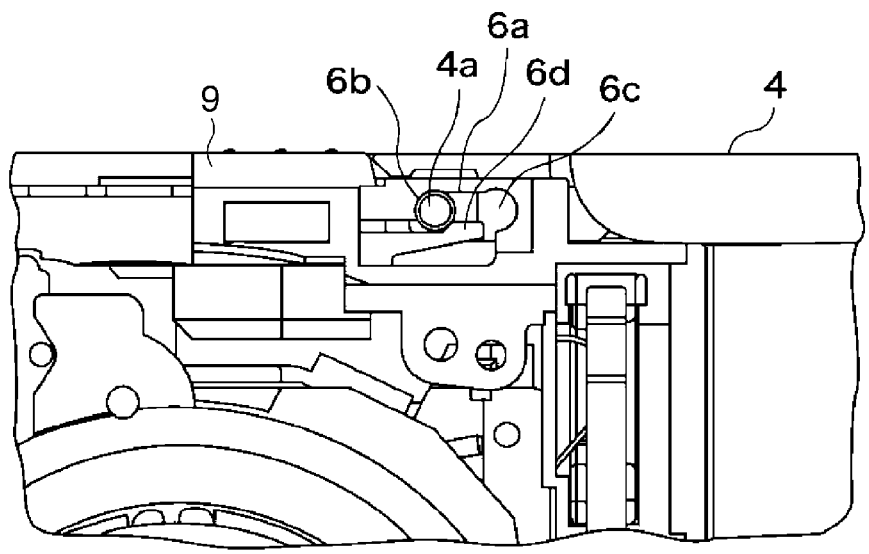
FIG. 5B is a fragmentary enlarged view showing a positional relation between the pivot shaft and the battery lid-mounting hole in a state where the battery lid is fully closed.
Figure 6:
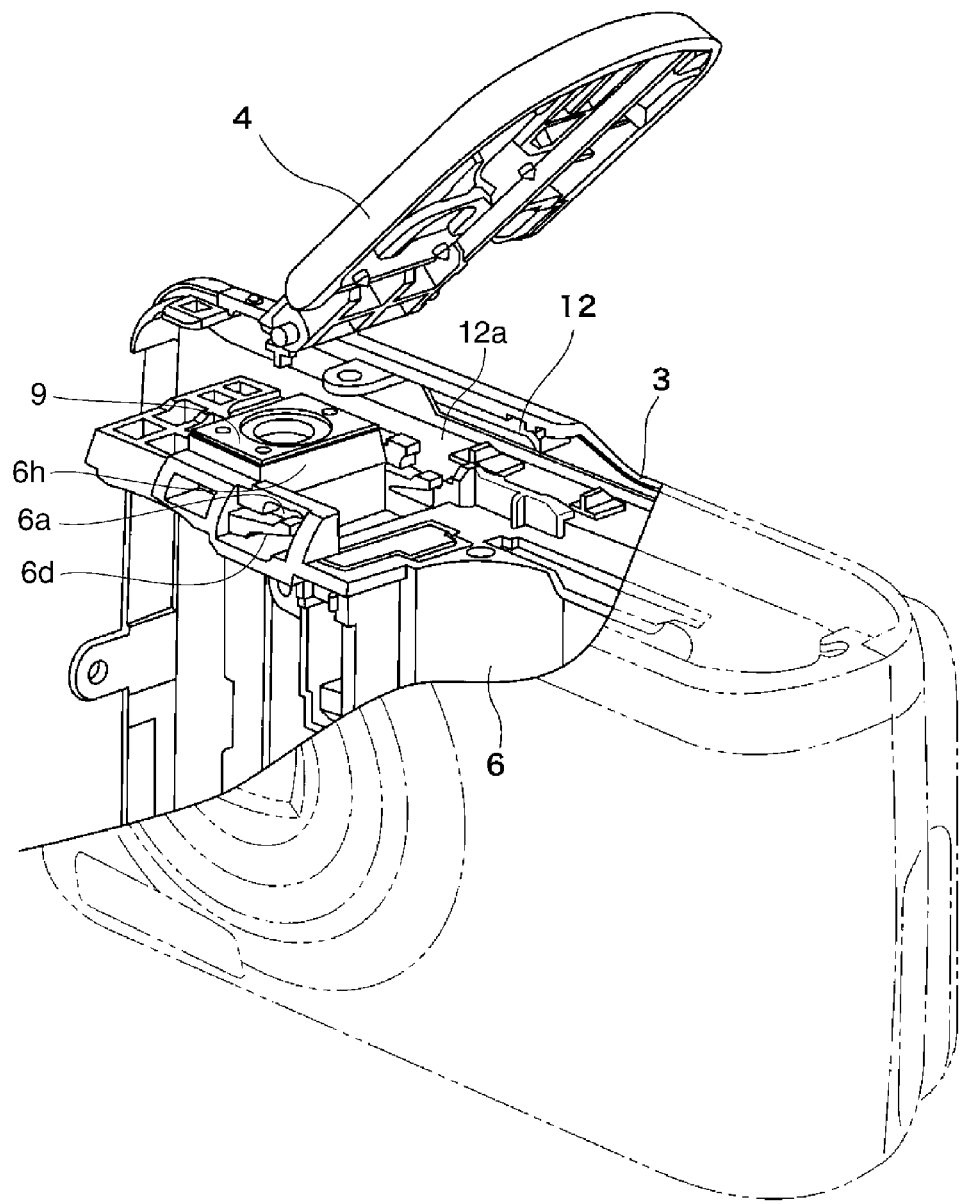
FIG. 6 is a perspective view, partly broken away, of the image pickup apparatus showing the construction of the battery case, the battery storage case, and the rear cover.

FIGS. 4A and 4B show the construction of the battery lid 4 and the battery storage case 6 in section views respectively taken along line A-A in FIG. 2A and along line B-B in FIG. 2B. FIGS. 5A and 5B show a positional relation between the pivot shaft 4a of the battery lid 4 and the battery lid-mounting hole 6a of the battery storage case 6 in respective states where the battery lid 4 is fully opened and where the battery lid 4 is fully closed. FIG. 6 shows the construction of the battery lid 4, battery storage case 6, and rear cover 3 in exploded perspective view.

As shown in FIG. 2B, engagement portions 4c, 4e are provided on the rear surface of the battery lid 4. Engagement portions 6c, 6e are provided on the battery storage case 6 at locations where the engagement portions 6c, 6e face the engagement portions 4c, 4e of the battery lid 4 when the battery lid 4 is fully closed relative to the battery storage case 6 (FIG. 2A). In the fully closed state of the battery lid 4, the engagement portions 4c, 4e of the battery lid 4 are respectively engaged with the engagement portions 6c, 6e of the battery storage case 6.

Engagement portions 4f, 4g are also provided on the rear surface of the battery lid 4. Engagement portions 2f, 2g are provided on the front cover 2 at locations where the engagement portions 2f, 2a face the engagement portions 4f, 4g of the battery lid 4 when the battery lid 4 is in the fully closed state. In the fully closed state of the battery lid 4, the engagement portions 4f, 4g of the battery lid 4 are held by the engagement portions 2f, 2g of the front cover 2.

When the battery lid 4 is fully closed as shown in FIG. 4A, a battery lid end 4b where the battery lid 4 is attached to the battery storage case 6 faces a tripod base's inclined end surface 6h of the storage case 6, with a minimum required gap therebetween. When the battery lid 4 slidably engaged with the elongated hole 6a (FIG. 1) of the storage case 6 is opened from the fully closed state, the battery lid 4 is slidably moved in a direction parallel to the bottom surface of the housing and perpendicular to the pivot shaft 4a, and is pivoted about the pivot shaft 4a to the fully opened state (FIG. 4B).

To ensure the conductivity between the batteries (FIG. 2B) and the battery contacts 11a, 11b of the battery storage case 6, the battery contacts 11a, 11b are configured to have resiliency as shown in FIG. 3, thereby ensuring contact pressures applied from the battery contacts 11a, 11b to the batteries 5.

As shown in FIGS. 4A and 4B, the battery lid end 4b is formed to have an inclined surface 4h that obliquely extends such that an outer side thereof (an upper side thereof as viewed in FIG. 4A) projects closer to the tripod base 9 than an inner side thereof (a lower side thereof as viewed in FIG. 4A). On the other hand, the tripod base's inclined end surface 6h obliquely extends such that an inner side thereof projects closer to the battery lid 4 than an outer side thereof. In the fully closed state shown in FIG. 4A, the inclined surface 4h of the battery lid 4 faces and extends nearly parallel to the tripod base's inclined end surface 6h of the battery storage case 6. A rib 6e is formed on the battery storage case 6 for contact with the inclined surface 4h of the battery lid 4 when the lid 4 is fully opened as shown in FIG. 4B. Before the battery lid 4 when opened is in contact at its outer surface with an outer surface of the image pickup apparatus 1, the inclined surface 4h of the battery lid 4 is brought to abut against the rib 6e of the battery storage case 6 to thereby stop a movement of the battery lid 4, so that a coated surface and an appearance surface of the image pickup apparatus are prevented from being scratched. On the other hand, the inclined surface 4h can be scratched by being brought to abut against the rib 6e. However, even in such a case, the scratched inclined surface 4h does not become an appearance surface and does not become visible since the inclined surface 4h obliquely extends such that the outer side thereof projects closer to the tripod base 9 than the inner side thereof. Thus, a user is able to perform battery replacement and memory card replacement without worrying about the image pickup apparatus getting scratched. In addition, it is unnecessary to worry about the painting peeling off by long time use.

In an arrangement where the click spring is formed integrally with the battery storage case by using a resin material as described in the "BACKGROUND OF THE INVENTION" of this specification, there are often provided a recess on the rear surface of the battery lid and a pawl on the battery storage case so as to face the recess. In most cases, however, to prevent a movement of the battery lid from being hindered when the battery lid is operated to be opened or closed, a distance between the pivot shaft and an end surface of the battery lid is made small, the end surface of the battery lid is formed into a circular shape, and a recess to ensure a desired open angle of the battery lid is formed on an outer appearance surface of the image pickup apparatus. As a result, the image pickup apparatus is sometimes restricted in design.

The elongated battery lid-mounting hole 6a at the battery lid mounting end of the battery storage case 6 (see, FIGS. 5A and 5B) is formed by using a slide mold movable in the optical axis direction of the image pickup apparatus. This elongated hole 6a includes first and second shaft holes 6b, 6c which are in communication with each other. The first shaft hole 6b is a shaft hole at which or with which the pivot shaft 4a of the battery lid 4 is positioned (or engaged) when the battery lid 4 is in a state locked with the battery storage case 6, as shown in FIG. 5B. The second shaft hole 6c is a shaft hole in which or with which the pivot shaft 4a is positioned (or engaged) when the battery lid is in a state released from locking with the battery storage case 6, as shown in FIG. 5A.

A hook portion 6d of the battery storage case 6 (more generally, a hook) is pivotably disposed between the first and second shaft holes 6b, 6c. The hook portion 6d is formed to extend toward the battery lid-mounting hole 6a from the tripod base 9 that has high rigidity among parts of the battery storage case 6. The hook portion 6d is disposed to face one side (a lower side in FIGS. 5A and 5B) of a space (hole) extending between the first and second shaft holes 6b, 6c in the elongated battery lid-mounting hole 6a, and defines the one side of the space. This space is formed such that the pivot shaft 4a of the battery lid 4 is movable therealong when the battery lid 4 is operated to be opened or closed, and is formed to be narrow such that a click force is generated by the contact between the hook portion 6d and the pivot shaft 4a slid along the space.

Specifically, the hook portion 6d is formed by a resin into a spring shape so as to be elastically deformed and pivoted by the contact between the hook portion 6d and the pivot shaft 4a of the battery lid 4 when the pivot shaft 4a is slid along and passes through the space between the first and second shaft holes 6b, 6c in the elongated battery lid-mounting hole 6a, while being in contact with the hook portion 6d. The hook portion 6d is pivoted to the direction to expand the space between the first and second shaft holes 6b, 6c when the pivot shaft 4a is moved in the space between the first and second shaft holes 6b, 6c than when the pivot shaft 4a is positioned in the first shaft hole 6b or in the second shaft hole 6c.

Accordingly, it is possible to obtain a click force when the battery lid 4 is slid to be opened or closed relative to the battery storage case 6. It is also possible to urge the pivot shaft 4a toward the first shaft hole 6b or the second shaft hole 6c, whereby the battery lid 4 is prevented from being rattled. In addition, the first and second shaft holes 6b, 6c are not visible from the outside when the battery lid 4 is opened and closed. It is therefore unnecessary, when subsequently changing the click force, to worry about influence on the outer appearance of the image pickup apparatus, whereby increased degree of freedom in design is provided.

As shown in FIGS. 4A and 4B, the inclined surface 4h of the battery lid 4 and the tripod base's inclined end surface 6h of the battery storage case 6 facing the inclined surface 4h extend obliquely relative to the bottom surface of the housing, respectively. In addition, the battery lid end 4b and the tripod base's inclined end surface 6h are provided at locations remote from the pivot shaft 4a of the battery lid 4. It is therefore possible to increase a relative distance between the tripod base's inclined end surface 6h and the battery lid 4 when the battery lid 4 is open, whereby a greater open angle of the battery lid 4 can be obtained. As a result, it becomes unnecessary to form a recess on the outer appearance surface of the battery lid 4 in order to ensure a desired open angle of the lid 4, and the outer appearance surface of the battery lid 4 is not restricted in design. This is advantageous in providing, e.g., a sculpture character such as a safety standards mark on the apparatus.

In this embodiment, the tripod base's inclined end surface 6h is formed by obliquely cutting a part of the tripod base 9 of the image pickup apparatus, but no substantial problem is caused since the resultant reduction of strength of the tripod base appears only in an incomplete thread range of a tripod screw.

If two elongated battery lid-mounting holes 6a respectively facing both ends of the pivot shaft 4a of the battery lid 4 are formed in the battery storage case 6, i.e., if both the ends of the pivot shaft 4a are attempted to be engaged with respective ones of the two elongated holes 6a formed in the battery storage case 6, the ease of assembly of the battery lid 4 into the battery storage case 6 is impaired.

In this embodiment, as shown in FIG. 6, the elongated battery lid-mounting hole 6a including the first and second shaft holes 6b, 6c is formed in the battery storage case 6 so as to face one end (on the side remote from the rear cover 3) of the pivot shaft 4a of the battery lid 4, whereas an elongated hole 12a is formed in a rib 12 of the rear cover 3 so as to face another end (on the side close to the rear cover 3) of the pivot shaft 4a. Specifically, the one end of the pivot shaft 4a of the battery lid 4 is engaged with the elongated hole 6a of the battery storage case 6, whereas the other end of the pivot shaft 4a is engaged with the elongated hole 12a of the rib 12 of the rear cover 3.

When the battery lid 4 is assembled to the battery storage case 6, the pivot shaft 4a of the battery lid 4 on the side close to the rear cover 3 does not interfere with the rear cover 3 since the rear cover 3 has not yet been assembled to the case 6. It is therefore possible to assemble the battery lid 4 to the battery storage case 6 without any trouble by engaging the end of the pivot shaft 4a of the battery lid 4 on the side remote from the rear cover 3 with the elongated hole 6a of the battery storage case 6. Accordingly, it is unnecessary to pry the pivot shaft 4a to engage it with the elongated hole. Subsequently, when the rear cover 3 is assembled to the battery storage case, the end of the pivot shaft 4a of the battery lid 4 on the side close to the rear cover 3 is bought in engagement with the elongated hole 12a of the rear cover 3. Thus, both the ends of the pivot shaft 4a are held by the elongated hole 6a of the battery storage case 6 and the elongated hole 12a of the rear cover 3, respectively.

As described above, the image pickup apparatus of this embodiment has the hook portion 6d that is pivotably disposed so as to face the space between the first and second shaft holes 6b, 6c in the elongated battery lid-mounting hole 6a of the battery storage case 6. The hook portion 6d is pivoted in the direction to expand the space between the shaft holes 6b, 6c when the pivot shaft 4a is moved between the first and second shaft holes 6b, 6c than when the pivot shaft 4a is positioned in the first shaft hole 6b or in the second shaft hole 6c. Furthermore, the end of the pivot shaft 4a on the side close to the rear cover 3 is held by the elongated hole 12a formed in the rib 12 of the rear cover 3.

It is therefore possible to obtain a click force when the pivot shaft 4a of the battery lid 4 is slid. The click force can relatively easily be adjusted, and the ease of assembly of the battery lid 4 can be improved. Since the coated surface and the appearance surface of the image pickup apparatus are prevented from being scratched when the battery lid 4 is assembled to the battery storage case 6 and when the battery lid 4 is opened and closed relative to the battery storage case 6, battery replacement and memory card replacement can be carried out without worrying about the image pickup apparatus getting scratched. In addition, it is unnecessary to worry about the painting peeling off by long time use.

Furthermore, since it is unnecessary to form a recess or the like on the outer appearance surface of the battery lid 4 in order to ensure the open angle of the lid 4, the degree of freedom in designing the outer surface appearance of the battery lid can be increased.

Since the pivot shaft 4a of the battery lid 4 is urged toward either one of the first and second shaft holes 6b, 6c constituting the elongated battery lid-mounting hole 6a of the battery storage case 6, it is possible to prevent the battery lid 4 from being rattled.

In brief, according to this invention, it is possible to provide the image pickup apparatus that ensures the ease of assembly of and the ease of open/close operation of the battery lid 4 without increasing the number of parts and that enables the user to open and close the battery lid 4 without worrying about the image pickup apparatus getting scratched. Furthermore, this invention is advantageous, for example, in that a click force can be obtained when the battery lid 4 is operated to be opened or closed.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-290971, filed Dec. 22, 2009, which is hereby incorporated by reference herein in its entirety.

What is claimed is:

1. An electronic device comprising a storage member and a lid member having a pivot shaft and being openable and closable relative to the storage member and lockable with the storage member,
    wherein said storage member is formed with a first shaft engagement portion in which the pivot shaft is positioned when said lid member is locked with said storage member and a second shaft engagement portion in which said pivot shaft is positioned when said lid member is released from locking with said storage member, the first and second shaft engagement portions being formed consecutively, and
    a hook, at least a portion of which is disposed between the first and second shaft engagement portions to be deformable by being in contact with the pivot shaft moved between the first and second shaft engagement portions.

2. The electronic device according to claim 1, wherein the portion of said hook is disposed in a space between the first and second shaft engagement portions and deformed in a direction to expand the space when the pivot shaft is moved between the first and second shaft engagement portions while being in contact with at least a part of the portion of said hook than when the pivot shaft is positioned in the first shaft engagement portion or in the second shaft engagement portion.

3. The electronic device according to claim 1, wherein said storage member is formed with a tripod base, and
    said hook is formed to project from the tripod base toward between the first and second shaft engagement portions.

4. The electronic device according to claim 1, wherein said storage member is formed with a contact portion with which an end surface of said lid member is in contact when said lid member is in a fully open state, and
    the end surface does not constitute an outer appearance surface of said lid member when said lid member is in a closed state.

5. The electronic device according to claim 1, wherein the electronic device is an image pickup apparatus in which said storage member is used to store at least one battery.

6. The electronic device according to claim 1 further comprising:
    a cover member configured to cover said storage member,
    wherein the first and second shaft engagement portions includes one pair of first and second shaft engagement portions and another pair of first and second shaft engagement portions,
    wherein said one pair of first and second shaft engagement portions are formed in said storage member, and
    wherein said another pair of first and second shaft engagement portions are formed by being assembled said cover member to said storage member.

7. An electronic device comprising:
    a storage member; and
    a lid member having a pivot shaft and being openable and closable relative to said storage member and lockable with said storage member,
    wherein a shaft engagement portion is formed in said storage member,
    wherein the pivot shaft is inserted into the shaft engagement portion and the pivot shaft is movable between a first shaft engagement position and a second shaft engagement position,
    wherein the pivot shaft is positioned at the first shaft engagement position when said lid member is locked with said storage member,
    wherein the pivot shaft is positioned at the second shaft engagement position when said lid member is released from locking with said storage member,
    wherein said storage member is formed with a tripod base portion,
    wherein a hook is formed to project from the tripod base portion toward the shaft engagement portion, and
    wherein at least a portion of the hook is provided between the first shaft engagement position and the second shaft engagement position, and at least a part of the portion of the hook is in contact with the pivot shaft when the pivot shaft is moved between the first shaft engagement position and the second shaft engagement position.

8. The electronic device according to claim 7,
    wherein the hook is formed integrally in said storage member, and
    wherein the hook is deformed when the pivot shaft is moved between the first shaft engagement position and the second shaft engagement position.

9. The electronic device according to claim 7,
    wherein an outer side surface of said lid member projects closer to the tripod base portion than an inner side surface of said lid member, and said lid member has an inclined end surface,
    wherein said storage member is formed with a contact portion with which the inclined end surface is in contact when said lid member is fully opened, and
    wherein the contact portion is cover.

10. The electronic device according to claim 9,
    wherein the contact portion is covered by said lid member when said lid member is locked with said storage member.

11. The electronic device according to claim 7,
    wherein said storage member is used to store at least one battery.

12. The electronic device according to claim 7 further comprising:
a cover member configured to cover said storage member,
wherein the shaft engagement portion includes one shaft engagement portion and another shaft engagement portion,
wherein said one shaft engagement portion is formed in said storage member, and
wherein said another shaft engagement portion formed by being assembled said cover member to said storage member.

* * * * *